United States Patent Office 3,047,517
Patented July 31, 1962

3,047,517
LOW DENSITY, RESILIENT POLYURETHANE FOAM AND METHOD FOR PREPARING SAME
Fred J. Wherley, Cleveland, Ohio, assignor to The B. F. Goodrich Company, New York, N.Y., a corporation of New York
No Drawing. Filed May 15, 1959, Ser. No. 813,351
4 Claims. (Cl. 260—2.5)

This invention relates to low density, resilient polyurethane foams and more particularly pertains to low density, resilient foams of polyurethanes resulting from the reaction of active hydrogen terminated polymers and aromatic polyisocyanates and to the method for preparing said foams.

An object of this invention is the provision of low density foamed compositions. Another object is the provision of low density, resilient foamed structures. Another object is the provision of a method for preparing low density, resilient foamed structures. The accomplishment of these and other objects will become apparent from the following description and examples, it being understood that numerous changes and modifications can be made in the specific embodiments set forth herein without departing from the spirit and scope of this invention.

I have discovered a method for preparing novel foamed compositions comprising reacting an active hydrogen terminated polymer with from about 2 to 3 equivalents per equivalent of active hydrogen in said polymer of an aromatic diisocyanate containing at least about 20% by weight based on the total weight of diisocyanate of a member selected from the group consisting of 2,6-tolylene diisocyanate, m-phenylene diisocyanate, p,p'-diisocyanato diphenyl methane and p-phenylene diisocyanate, then treating the product with a diisocyanate comprising at least about 80% by weight based on the total weight of diisocyanate of a member selected from the group consisting of 2,4-tolylene diisocyanate and 2,4-cumene diisocyanate and finally treating the entire mixture with a water-catalyst mixture.

The active hydrogen terminated polymers embodied in this invention are those having terminal hydrogens which will react with methyl magnesium iodide to liberate methane in the Zerewitinoff reaction. The preferred active hydrogen terminated polymers are the substantially hydroxyl terminated polyethers and polyesters having molecular weights in the range of from about 500 to about 10,000 and preferably in the range of from about 1,000 to about 5,000. The useful hydroxyl terminated polyethers include those derived from alkylene oxides, glycols, triols or from heterocyclic ethers. It is not necessary that all of the alkylene groups be the same in a given polyether glycol. The preferred hydroxyl terminated polyethers are polypropylene oxide diols; polypropylene oxide triols, such as that formed by the polymerization of propylene oxide onto a triol, such as hexane triol, glycerine, trimethylol propane, and the like; mixtures of polypropylene oxide diol and small amounts of low molecular weight polyols and polyamines, such as glycerol, tetrahydroxyethyl ethylene diamine, propylene oxide derivatives of sucrose, sorbitol and the like; polytetramethylene oxide diols, triols and polyols of the aforementioned types; and polyethylene oxide glycols. Polypentamethylene oxide glycols, polybutylene oxide glycols, polystyrene oxide glycols, polyhexamethylene oxide glycols, polyheptamethylene oxide glycols, polyoctamethylene oxide glycols and the like may also be used in this invention. The preferred hydroxyl terminated polyethers are the polyethylene oxide glycols, the polypropylene oxide glycols and the polybutylene oxide glycols.

The active hydrogen terminated polyesters useful in this invention include those substantially hydroxyl terminated which result from the esterification-condensation of a dicarboxylic acid or its anhydride with an excess of a glycol or a mixture of glycols. Representative acid moieties of these polyesters include malonic, succinic, glutaric, adipic, pimelic, sebacic, suberic, azelaic, maleic, itaconic, phthalic, terephthalic, and isophthalic acids, dimer acids obtained by polymerization of naturally occurring $C_{18}$ fatty acids and the like and representative glycol moieties of the polyesters include ethylene glycol, diethylene glycol, propylene glycol, trimethylene glycol, tetramethylene glycol, butenediol, butynediol, pentamethylene glycol, hexamethylene glycol, cyclohexylene glycol, heptamethylene glycol, octamethylene glycol, o-, m- and p-xylylene glycols and the like and others. The preferred hydroxyl terminated polyesters for the purpose of this invention are those which result from the condensation of adipic, sebacic, isosebacic, dimer and phthalic acid with alkylene glycols such as ethylene glycol, propylene glycol, diethylene glycol, trimethylene glycol, tetramethylene glycol and neopentylene glycol. The most preferred are the polyesters resulting from the condensation of adipic acid, neopentyl glycol and trimethylol propane; dimer acid with diethylene glycol; and isosebacic acids with 1,4-butanediol.

The polyisocyanates most useful in this invention are the aromatic diisocyanates. An essential feature of my invention which distinguishes it from the prior art is the use of at least two different types of diisocyanates and the order and ratio in which these diisocyanates are added during the preparation of my novel foamed compositions. The diisocyanates embodied in this invention are grouped according to their effectiveness as reactants in the various steps as (A) 2,6-tolylene diisocyanate, m-phenylene diisocyanate, p,p'-diisocyanato diphenyl methane and p-phenylene diisocyanate and (B) 2,4-tolylene diisocyanate and 2,4-cumene diisocyanate. The order of addition and amounts of (A) and (B) used in the preparation of my novel foamed compositions is discussed in more detail hereinbelow.

In a broad sense the preparation of my novel compositions involves, in a stepwise fashion, (1) the preparation of pre-prepolymer, (2) the preparation of prepolymer and finally, (3) the preparation of the foams themselves. Steps (1), (2) and (3) are now set forth in more detail.

The pre-prepolymer is prepared (step 1) from an active hydrogen terminated polymer, preferably a polyether glycol or a polyester glycol of the above-described types, containing a maximum of about 0.5% by weight of water by mixing with the polymeric glycol from about 2 to 3 equivalents of diisocyanate per equivalent of active hydrogen present in the polymeric glycol. The diisocyanate used in step 1 must comprise at least about 20% by weight based on the isocyanate used of an (A) type diisocyanate described above and the reaction is carried out at from about 25° C. to about 130° C. and preferably at from about 30° C. to about 90° C. in an inert atmosphere. The heating is discontinued after all of the —OH (includes H₂O) in the hydroxyl terminated polymer has reacted with isocyanate groups as determined by analysis for —NCO. If the pre-prepolymer is stored prior to the steps (2) and (3) it should be kept free of active hydrogen compounds, such as atmospheric moisture.

The prepolymer is prepared (step 2) by mixing additional diisocyanate with the pre-prepolymer described above, at normal temperatures and is an inert atmosphere. In this step, sufficient additional diisocyanate is added to impart a total of from about 9 to about 20% and preferably from about 10 to 17% by weight of free —NCO groups based on the weight of the total prepolymer mixture. The additional diisocyanate added in step (2) must comprise more than about 80% by weight based on the total weight of additional diisocyanate of a type (B) diisocyanate described herein. It is absolutely essential that substantially more (B) type diisocyanate be present in the diisocyanate added in step (2) than there is present in the diisocyanate added in step (1). If the prepolymer is not used at once in the preparation of foam (step 3) it must be stored in the absence of active hydrogen containing compounds.

The preparation of the resilient foams (step 3) is accomplished by adding a mixture of water and a basic catalyst to the prepolymer described in step (2) above. Water may be used in amounts equivalent to from about 90% to about 130% by weight of that required to react completely with the free —NCO present in the prepolymer. Many basic materials may be used to catalyze the foaming reaction. Representative catalysts are tertiary amines, such as triethyl amine, N-methyl morpholine, N,N,N',N'-tetramethyl butane diamine, triethylene diamine, ethylene oxide treated lauryl amine, 2-dimethylamino-2-methyl propanol-1, N,N'-dihydroxy propyl-2-methyl piperazine, mixtures of these and the like. Materials such as dibutyl tin dilaurate and potassium ricinoleate may be used in place of the aforementioned tertiary amine catalysts. The exact level of catalyst is not critical and the amount chosen will depend upon the activity of the particular catalyst and rapidity with which the foam is to be formed as well as the type of mixing which is to be employed. It is generally preferred to include foam stabilizers in the prepolymer prior to the foaming operation, such stabilizers being typified by silicone oils, hydroxyl modified silicone oils and others. The foams are usually prepared at about room temperature although the exothermic reaction causes a considerable rise in temperature during the course of the foaming and curing operation. The foams can be prepared in open molds, closed molds, on the surface of forms or even continuously on conveyors and the like. It is often convenient to heat the foams prepared in the above manner in an oven at from 100–130° C. for from about half an hour to about 3 hours to insure optimum physical properties.

Although the above procedure is the most preferred method for preparing my novel foamed compositions, other less convenient methods may be used without departing from the spirit and scope of my invention. For example, the pre-prepolymer can be prepared with lower or higher ratios of diisocyanate than those disclosed above and the prepolymer then is prepared with a correspondingly larger or smaller amount of additional diisocyanate than that disclosed in step (2) above.

In any event, the foamed compositions embodied in this invention preferably should be prepared with less than 30% by weight based on the total weight of diisocyanate of a type (A) diisocyanate and the remaining diisocyanate must be of type (B). It is most preferred that from about 8–25% of a type (A) and from 75 to 92% of a type (B) diisocyanate be used.

The foamed compositions embodied in this invention are characterized as having densities of less than 2 pounds per cubic foot, and having good compression sets, resilience, tensile and modulus. Foamed compositions prepared with either type (A) or type (B) diisocyanates alone or with mixtures of type (A) and type (B) falling outside the limits defining my invention are lacking in one or more of the aforementioned desirable physical properties.

The compositions of this invention are useful for seat cushions, mattresses, clothing liners, rug underlays, shock absorption, insulation and numerous other applications.

In the following illustrative examples the amounts of ingredients are expressed as parts by weight unless otherwise indicated.

*Example I*

A pre-prepolymer was prepared from a polypropylene oxide triol resulting from the polymerization of propylene oxide on glycerol. 754 g. of the said polypropylene glycol triol having a molecular weight of 3,000 and containing 0.6 g. of water were placed in a closed reactor equipped with a mechanical stirrer. Stirring was commenced and continued throughout the reaction. To the stirred polyether were added 179 g. of a mixture of 32.9% 2,6- and 67.1% 2,4-tolylene diisocyanate and the reaction was allowed to proceed over a 2 hour period at a temperature of from 25° C. to 77° C. Heating was then discontinued and the product was stirred for 6 hours at room temperature. At the end of this time the product was found to contain 5.54% of free —NCO compared to the calculated percent of free —NCO of 5.6% which should remain after the complete reaction of diisocyanate with all of the —OH (including water) )in the polyether. The pre-prepolymer had a viscosity of 6,300 cps. at 25° C. by Brookfield viscometer measurement.

The prepolymer was prepared by placing 50 g. of the above-described pre-prepolymer in a closed reactor equipped with an efficient stirrer and adding, with continuous stirring, 14.3 g. of a mixture of about 97% 2,4- and about 3% 2,6-tolylene diisocyanate. The resulting prepolymer was found to contain 15% of free —NCO.

A resilient, open-pore foam was prepared by mixing into the above-described prepolymer first, 0.3 cc. of a silicone oil having 50 centistokes viscosity to serve as foam stabilizer, and second, with efficient stirring, a catalyst mixture of 2.28 cc. of water, 0.8 cc. of N-methyl morpholine and 0.2 cc. of triethyl amine. The resulting mxture was poured into a mold and the foam formed in place exothermically. The finished foam was produced in 3 minutes from the time the catalyst was added.

The above-described foam was allowed to stand for 5 minutes and it was then heated in an oven at 70° C. for half an hour. The resulting foam was cooled and squeezed a few times to break any closed cells. The foam was then heated at 120° C. in an oven for 4 hours to complete the cure. The product had the following physical properties:

Cut density (outer skin cut off) _____ 1.54 pounds/ft.³.
Resilience _____ 30%.
Tensile _____ 18.6 p.s.i.
Elongation _____ 210%.
25% compression modulus _____ 0.5 p.s.i.

*Example II*

The procedure described in Example I was used herein except where otherwise indicated. The pre-prepolymer was prepared by adding to 400 g. of polypropylene oxide diol, having a molecular weight of 2,000, twelve grams of a mixture of about 35% 2,6- and 65% 2,4-tolylene diisocyanate at a temperature of about 90° C. and the mixture was heated until all of the free —NCO had disappeared. To the resulting product were added 15 g. of N,N,N',N'-tetraisopropanol ethylene diamine, 0.1 cc. of benzoyl chloride and 111 g. of a mixture of about 35%

2,6- and 65% 2,4-tolylene diisocyanate and the mixture was allowed to react at 90° C. with stirring for 16 hours. The resulting pre-prepolymer was found to contain 5.8% free —NCO and it had a viscosity of 13,400 cps. at room temperature.

The prepolymer was prepared by adding to 40 g. of the above-described pre-prepolymer 12.8 g. of 97% pure 2,4-tolylene diisocyanate to give a product having 16% free —NCO groups.

A foam was prepared by adding to the prepolymer 0.32 cc. of a silicone oil (50 centistokes viscosity) and a catalyst mixture consisting of 1.88 cc. of water and 0.36 cc. of triethyl amine. The cured resilient foam had the following physical properties:

Density _____ 1.34 pounds/ft.³.
Resilience _____ 29%.
Compression set (70° C.) _____ 9%.
25% compression modulus _____ 0.45 p.s.i.

The lowest-density foam of the above-described type which could be prepared using 97% 2,4-tolylene diisocyanate in the pre-prepolymer reaction and 35% 2,6-, 65% 2,4-tolylene diisocyanate in the prepolymer preparation had a density of 2.04 pounds/ft.³ and was of poor resiliency.

Example III

The procedures given in Example I were followed except where otherwise indicated. A pre-prepolymer was prepared from 2,000 g. of polypropylene oxide diol having a molecular weight of 2,000 containing 4 g. of water and 613 g. of a mixture of about 35% 2,6- and 65% 2,4-tolylene diisocyanate. The reaction was carried out at a temperature up to 65° C. for 3½ hours. The stirred reaction mixture was then maintained at 120° C. for 4 hours. The resulting pre-prepolymer contained 6.5% free —NCO groups and it had a viscosity of 5,300 cps.

The prepolymer having a free —NCO content of 15% was prepared by combining 50 g. of the above-described pre-prepolymer and 7.6 g. of 97% pure 2,4-tolylene diisocyanate.

A resilient foam was prepared from the above-described prepolymer by adding first 0.3 cc. of silicone oil and then a catalyst mixture consisting of 1.63 cc. of water, 0.9 cc. of N-methyl morpholine and 0.18 cc. of triethyl amine. The cured foam had the following physical properties:

Density _____ 1.6 pounds/ft.³.
Resilience _____ 32.7%.
25% compression modulus _____ 0.6 p.s.i.

Example IV

The procedures of Example I were followed except as otherwise indicated. A pre-prepolymer was prepared starting with a mixture of 2,000 g. of polypropylene oxide diol having a molecular weight of 2,000 and 1,000 g. of polypropylene glycol triol having a molecular weight of 3,000, said mixture containing 4 g. of water. A mixture of 800 g. containing about 20.8% 2,6- and 79.2% 2,4-tolylene diisocyanate was added to the polyether mixture and the reaction was carried out at 50° C. The pre-prepolymer product had a viscosity of 3,900 cps.

The prepolymer prepared from 45 g. of the above-described pre-prepolymer and 8.6 g. of 97% pure 2,4-tolylene diisocyanate had a free —NCO content of 13%.

The resilient foam was prepared by adding 0.3 cc. of silicone oil to the prepolymer, followed by the addition of a catalyst mixture consisting of 0.6 cc. of water, 1.35 cc. of a 25 percent aqueous solution of trimethyl amine, 0.04 g. of triethylene diamine and 0.15 cc. of triethyl amine. The resulting cured foam had a density of 1.73 pounds/ft.³, a resilience of 28%, an elongation of 240% and a 25% compression modulus of 0.3 p.s.i.

Example V

A pre-prepolymer was prepared by the procedure of Example I from 600 g. of polypropylene oxide triol having a molecular weight of 3,000, 0.1 cc. of ethyl cyanoacetate, and 133 g. of a mixture of 96% 2,6- and 4% 2,4-tolylene diisocyanate. The reaction was carried out at from 25–35° C. for 3 days. The product had a room temperature viscosity of 10,000 cps. and a free —NCO content of 5.02%.

The prepolymer was prepared by mixing 40 g. of the above-described pre-prepolymer with 15.4 g. of 2,4-cumene diisocyanate. The product had a free —NCO content of 15%.

The foam was prepared by first adding 0.25 cc. of silicone oil to the prepolymer followed by the addition of catalyst solution consisting of 1.98 cc. of water, 1 cc. of N-methyl morpholine and 0.2 cc. of triethyl amine. The cured foam had a density of 1.76 pounds/ft.³, a resilience of 38% and a 25% compression modulus of 0.95 p.s.i.

Example VI

The procedure of Example I was followed. The pre-prepolymer was made by reacting 600 g. of polypropylene oxide triol having a molecular weight of 3,000 and containing 0.2 cc. of ethyl cyanoacetate with 121 g. of m-phenylene diisocyanate. The reaction was conducted at 40° C. for 3 hours and the product was stirred for 48 hours at room temperature. The pre-prepolymer prepared thusly had a viscosity at room temperature of 9,200 cps. and a free —NCO content of 5.05%.

The prepolymer resulting from the mixing of 40 g. of the above-described pre-prepolymer with 13.7 g. of 97% pure 2,4-tolylene diisocyanate had a free —NCO content of 16%.

The foam which was made by adding to the prepolymer containing 0.25 cc. of silicone oil a catalyst mixture consisting of 2.02 cc. of water, 0.8 cc. of N-methyl morpholine and 0.16 cc. of triethyl amine had a density of 1.41 pounds/ft.³ and a resilience of 26%.

Example VII

The procedure described in Example III was used. The pre-prepolymer was prepared from 700 g. of polytetramethylene oxide diol having a molecular weight of 3,000 and a water content of 1.4 g., 0.3 cc. of ethyl cyanoacetate and 158 g. of a mixture of about 35% 2,6- and 65% 2,4-tolylene diisocyanate.

The prepolymer was prepared from 35 g. of the pre-prepolymer, 0.1 cc. of 50 centistokes silicone oil and 6.3 g. of 97% pure 2,4-tolylene diisocyanate.

The foam was prepared with a catalyst mixture consisting of 1.3 cc. of water, 1. cc. of N-methyl morpholine, 0.1 cc. of N,N,N',N'-tetramethyl-1,4-butane diamine and 0.30 cc. of an ethylene oxide treated lauryl amine having the formula

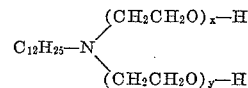

wherein $x+y=15$. The foam was cured in a humid atmosphere at 120° C. and was found to have a density of 1.8 pounds/ft.³ and a resilience of 35%.

Example VIII

The procedure of Example I was followed unless otherwise specified. The pre-prepolymer was prepared from 600 g. of a polyester having an acid number of 0.9 and an —OH number of 60 resulting from the condensation-esterification of adipic acid, with a mixture of a slight excess of neopentyl glycol and 2.5% trimethylol propane based on the weight of adipic acid, 0.3 cc. of ethyl cyanoacetate and 171 g. of a mixture of about 35% 2,6- and 65% 2,4-tolylene diisocyanate. This mixture was allowed to react at a temperature up to 73° C. for 45 minutes. To the resulting mixture were added 87 g. of 97% pure 2,4-tolylene diisocyanate and the reaction was continued for 16 hours. The product had a free —NCO content of 8.9%.

The prepolymer was prepared by adding 2.8 g. of a mixture of 15.5% 2,6- and 84.5% 2,4-tolylene diisocyanate to 35 g. of pre-prepolymer. The prepolymer had a free —NCO content of 12%.

The foam was prepared by first mixing 1.5 g. of didecyl phthalate and 0.07 cc. of silicone oil into the prepolymer and then adding a catalyst mixture consisting of 1.05 cc. of water, 0.3 cc. of N-methyl morpholine, 0.25 cc. of a 70% aqueous solution of N,N,N',N'-tetramethyl ethylene diamine. The cured foam was flexible and had a density of 1.85 pounds/ft.$^3$. A repeat of the above procedure wherein 5 g. of 97% pure 2,4-tolylene diisocyanate were used in preparing the prepolymer gave a prepolymer having a free —NCO content of 14%. The foam prepared from this prepolymer in the above-described manner with an additional 1.3 cc. of water was flexible and had a density of 1.36 pounds/ft.$^3$.

I claim:
1. The foamed structure having a density of less than two pounds per cubic foot and a resiliency of from about 26 to 38% comprising the product which results from (1) reacting at least one hydroxyl terminated polymer selected from the group consisting of hydroxyl terminated polyethers which result from the polymerization of an alkylene oxide onto at least one member selected from the group consisting of alkylene glycols and a trihydroxy alkane having from 3 to 6 carbon atoms and polyesters which result from the esterification-condensation of a dicarboxylic acid with an excess of a glycol said polymer having a molecular weight of from about 500 to about 10,000 and containing a maximum of about 0.5% by weight of water with from 2 to 3 equivalents per equivalent of hydroxyl present in said polymer of a diisocyanate containing from 20 to 100% by weight based on the weight of diisocyanate of a member of the group consisting of 2,6-tolylene diisocyanate, m-phenylene diisocyanate, p,p'-diisocyanato diphenylamine and p-phenylene diisocyanate at a temperature of from about 30° C. to about 90° C. and (2) mixing with (1) additional diisocyanate containing from 80 to 100% by weight based on the weight of additional diisocyanate of 2,4-cumene diisocyanate to impart a free —NCO content of from 10 to 17% by weight based on the weight of (2), and (3) stirring into (2) a foam stabilizer followed by a mixture of from 90 to 130% by weight of the water required to react completely with the free —NCO present in (2) and at least one member of the group consisting of triethyl amine, N-methyl morpholine, N,N,N',N'-tetramethyl 1,4-butane diamine, ethylene oxide treated lauryl amine, triethylene diamine, 2-dimethyl amino-2-methyl propanol-1, N,N'-dihydroxyl propyl-2-methyl piperazine, dibutyl tin dilaurate and potassium ricinoleate.

2. The method for preparing foamed structures having densities of less than two pounds per cubic foot and resiliency of from about 26 to 38% comprising (1) reacting at least one hydroxyl terminated polymer selected from the group consisting of hydroxyl terminated polyethers which result from the polymerization of an alkylene oxide onto at least one member selected from the group consisting of alkylene glycols and a trihydroxy alkane having from 3 to 6 carbon atoms and polyesters resulting from the esterification-condensation of a dicarboxylic acid with an excess of a glycol said polymer having a molecular weight of from about 500 to 10,000 and containing a maximum of about 0.5% by weight of water, with from 2 to 3 equivalents per equivalent of active hydrogen present in said polymer of a diisocyanate containing from 20 to 100% by weight based on the weight of total diisocyanate of a member of the group consisting of 2,6-tolylene diisocyanate, m-phenylene diisocyanate, p,p'-diisocyanato diphenylmethane and p-phenylene diisocyanate at a temperature of from about 30 to 90° C. and (2) mixing with (1) additional diisocyanate containing from 80 to 100% by weight of 2,4-cumene diisocyanate to impart free —NCO content of from 10 to 17% by weight based on the weight of (2), and (3) stirring into (2) a foam stabilizer followed by a mixture of from 90 to 130% by weight of the water required to react completely with the free —NCO present in (2) and at least one catalyst selected from the group consisting of triethyl amine, N-methyl morpholine, N,N,N',N'-tetramethyl butane diamine, ethylene oxide treated lauryl amine, triethylene diamine, 2-dimethyl-amino-2-methyl propanol-1, N,N-dihydroxy propyl-2-methyl piperazine, dibutyl tin dilaurate and potassium ricinoleate.

3. The foamed structure having a density of less than two pounds per cubic foot and a resiliency of from about 26 to 38% comprising the product which results from (1) reacting a polypropylene oxide triol which results from the polymerization of propylene oxide onto a trihydroxy alkane having from 3 to 6 carbon atoms having a molecular weight of from about 1,000 to about 5,000 containing a maximum of about 0.5% by weight of water with from about 2 to 3 equivalents per equivalent of hydroxyl present in said triol of a diisocyanate containing from 20 to 100% by weight based on the weight of said diisocyanate of 2,6-tolylene diisocyanate at a temperature of from about 30° C. to 90° C. and (2) mixing with (1) additional diisocyanate containing from 80 to 100% by weight based on the weight of additional diisocyanate of 2,4-cumene diisocyanate to impart a free —NCO content of from 10 to 17% by weight on the weight of (2), and (3) stirring into (2) a foam stabilizer followed by a mixture of from 90 to 130% by weight of the water required to react completely with the free —NCO present in (2), N-methyl morpholine and triethyl amine.

4. The method for preparing a foamed structure having a density of less than two pounds per cubic foot and a resilience of from about 26 to 38% comprising (1) reacting at least one hydroxyl terminated polymer having a molecular weight of from about 500 to 10,000 selected from the group consisting of hydroxyl terminated polyethers which result from the polymerization of an alkylene oxide onto at least one member selected from the group consisting of alkylene glycols and a trihydroxy alkane having from 3 to 6 carbon atoms and polyesters which result from esterification-condensation of a dicarboxylic acid with an excess of a glycol with from 2 to 3 equivalents per equivalent of hydroxyl present in said polymer of a diisocyanate containing from 20 to 100% by weight based on the weight of said diisocyanate of a member of the group consisting of 2,6-tolylene diisocyanate, m-phenylene diisocyanate, p,p'-diisocyanato diphenyl methane and p-phenylene diisocyanate at a temperature of from about 25° C. to about 130° C. and (2) mixing with (1) additional diisocyanate containing from 80 to 100% by weight based on the weight of additional diisocyanate of 2,4-cumene diisocyanate to impart a free —NCO content of from 10 to 17% by weight on the weight of (2), and (3) stirring into (2) a foam stabilizer followed by a mixture of water and alkaline foaming catalyst.

References Cited in the file of this patent
UNITED STATES PATENTS

| 2,866,774 | Price | Dec. 30, 1958 |
|---|---|---|
| 2,888,411 | Pace | May 26, 1959 |
| 2,888,413 | Pace | May 26, 1959 |
| 2,949,431 | Britain | Aug. 16, 1960 |
| 2,955,056 | Knox | Oct. 4, 1960 |
| 2,955,091 | Kane | Oct. 4, 1960 |
| 2,965,584 | Elkin | Dec. 20, 1960 |
| 2,993,013 | Wolfe et al. | July 18, 1961 |

FOREIGN PATENTS

| 205,456 | Australia | Jan. 4, 1957 |

(Other references on following page)

OTHER REFERENCES

"Hylene TM, Organic Isocyanate," Du Pont Elastomers Div., Bul. HR-7, pages 2 and 3, December 1955.

Tufts et al.: "Urethane Foams From Polyoxyalkylene Block Polymers," Du Pont Elastomers Div., Bul. HR-21, pages 1-3, April 1957.

Tufts et al. "Urethane Foams from Terpolymers," Du Pont Elastomers Div., Bul. HR-22, pages 1-3, April 1957.

Tufts et al.: "Urethane Foams from Polyoxypropylene Glycol," Du Pont Elastomers Div., Bul. HR-23, pages 1 and 2, April 1957.

Tufts: "Urethane Foams From Polyoxyalkylene Polymers," Du Pont Elastomers Div., Bul. HR-24, pages 1 and 2, July 1957.

Wolfe et al.: "Urethane Foams From Polyoxypropylene Glycols of Molecular Weight 2000," Du Pont Elastomers Div., Bul. HR-27, 15 pages, pages 1-10 relied upon, July 1958.